United States Patent [19]
Takebayashi et al.

[11] Patent Number: 6,156,245
[45] Date of Patent: Dec. 5, 2000

[54] METHOD FOR MICROENCAPSULATING OF A SOLID SUBSTANCE

[75] Inventors: Yoshihiro Takebayashi, Toyonaka; Nobuhito Ueda, Ashiya; Shugo Nishi, Takarazuka, all of Japan

[73] Assignee: Sumitomo Chemical Company, Limited, Osaka, Japan

[21] Appl. No.: 09/257,951

[22] Filed: Feb. 26, 1999

[30] Foreign Application Priority Data

Mar. 5, 1998  [JP]  Japan .................................. 10-053368

[51] Int. Cl.⁷ ...................................................... B01J 13/02
[52] U.S. Cl. ...................... 264/4.7; 264/4.33; 428/402.21
[58] Field of Search ....................... 428/402.21; 424/400, 424/405, 408; 264/4.7, 4.33

[56] References Cited

U.S. PATENT DOCUMENTS

| | | | |
|---|---|---|---|
| 3,778,383 | 12/1973 | Schibler | 252/316 |
| 4,428,983 | 1/1984 | Nehen et al. | 427/213.34 |
| 4,443,497 | 4/1984 | Samejima et al. | 427/213.36 |
| 4,557,755 | 12/1985 | Takahashi et al. | 264/4.7 |
| 5,204,185 | 4/1993 | Seitz | 264/4.7 |

FOREIGN PATENT DOCUMENTS

| | | |
|---|---|---|
| 5-7063 | 1/1993 | Japan . |
| 7-78085 | 8/1995 | Japan . |
| 09052805A | 2/1997 | Japan . |
| 2 026 425 | 2/1980 | United Kingdom . |
| WO 94 13139 | 6/1994 | WIPO . |

*Primary Examiner*—P. Hampton-Hightower
*Attorney, Agent, or Firm*—Sughrue, Mion, Zinn Macpeak & Seas, PLLC

[57] ABSTRACT

The present invention provides a microencapsulation method of a solid substance and the microencapsulated composition obtained from said method of: (i) preparing a dispersion phase comprising (a) a solution containing a substance which forms a middle layer and (b) a solid substance that is insoluble or difficult to dissolve in said solution, (ii) obtaining a solid substance which has a layer made of the substance which forms the middle layer by phase-separating the substance which forms the middle layer from the solution and (iii) reacting a monomer that is polymelizable by condensation in the presence of the solid substance that has a layer made of the substance which forms the middle layer.

The above method can efficiently microencapsulate pharmaceutical active ingredients, pesticidal ingredients, aroma active ingredient and so on that are solid substances and affords an efficacious microencapsulated composition of solid substances.

13 Claims, No Drawings

METHOD FOR MICROENCAPSULATING OF A SOLID SUBSTANCE

FIELD OF THE INVENTION

The present invention relates to a method wherein active ingredients that are solid at room temperature are microencapsulated and a microencapsulated composition for especially biologically active (e.g. pharmaceutical, pesticidal) ingredients or the like.

BACKGROUND OF THE INVENTION

Priorly, the microencapsulation of biologically active ingredients has been numerously performed for the objective of increasing the efficacy, decreasing the toxicity or stabilization in pharmaceutical and pesticidal fields. Furthermore, for the field of printing and papermaking, the microencapsulation of pigments or coloring agents has been numerously employed.

As a microencapsulation method, the interfacial polymerization method, In-situ polymerization method, coacervation method, solvent evaporation method, spray-drying method and so on are known.

However, these methods have problems concerning the difficulty of adapting to a solid core, the reluctance to adapt to a comparatively unstable compound, the ease of mixing the solvent utilized during microencapsulation and dissatisfaction with the nature of the obtained microcapsules. None of the methods thereof are sufficient as a microencapsulation method of solids nor was the obtained microcapsule composition itself sufficient.

SUMMARY OF THE INVENTION

One subject for the objective of the present invention is to solve the problems of the prior methods previously mentioned, and to provide a method that regularly microencapsulates solid substances.

Another objective of the present invention is to provide an effectively superior microencapsulated composition of a solid substances.

The present invention relates to a microencapsulation method of a solid substance and the microencapsulated composition obtainable from said method of (i) preparing a dispersion phase comprising (a) a solution containing a substance which forms a middle layer and (b) a solid substance that is insoluble or difficult to dissolve in said solution, (ii) obtaining a solid substance which has a layer made of the substance which forms the middle layer by phase-separating the substance which forms the middle layer from the solution and (iii) polymerizing a monomer by condensation in the presence of the solid substance that has a layer made of the substance which forms the middle layer.

DETAILED DESCRIPTION OF THE INVENTION

The solid substance that becomes the core may either be an organic or inorganic substance if a solid at room temperature, and for example, biologically active substances such as pharmaceuticals (tetracycline hydrochlorides, fluorouracils, insulin and so on); pesticides described later; chemicals such as aroma chemicals like coumarin, coloring agents such as pigments, dyes and so on; inorganic powders such as silica, alumina and so on; resin powders such as polyethylene, silicone resins and nylon are given. The method of the present invention is preferably employed in biologically active substances such as pharmaceuticals and pesticides, and more preferably employed for pesticides.

Suitable pesticides are, for example, insecticides, fungicides, herbicides, repellents, insect growth regulators (e.g. chitin-synthesis inhibiters, juvenile hormone like agents), plant growth regulators and so on.

Examples of the insecticides and insect growth regulators include pyrethroid compounds such as cyfluthrin, cypermethrin, deltamethrin, fenpropathrin, esfenvalerate, tralomethrin, acrinathrin, bifenthrin, resmethrin and tetramethrin; carbamate compounds such as propoxur, isoprocarb, xylylcarb, metolcarb, XMC, carbaryl, pirimicarb, carbofuran, methomyl, fenoxycarb, alanycarb or metoxadiazone; organophosphorous compounds such as acephate, phenthoate, vamidothion, trichlorfon, monocrotophos, tetrachlorvinphos, dimethylvinphos, phosalone, chlorpyrifos, chlorpyrifos-methyl, pyridaphenthion, quinalphos, methidathion, methamidophos, dimethoate, formothion, azinphos-ethyl azinphos-methyl and salthion; urea compounds such as diflubenzuron, chlorfluazuron, lufenuron, hexaflumuron, flufenoxuron, flucycloxuron, cyromazine, diafenthiuron, hexythiazox, novaluron, teflubenzuron, trifulumron, 4-chloro-2-(2-chloro-2-methylpropyl)-5-(6-iodo-3-pyridylmethoxy)pyridazin-3(2H)-one, 1-(2,6-difluorobenzoyl)-3-[2-fluoro-4-(trifluoromethyl)phenyl]urea, 1-(2,6-difluorobenzoyl)-3-[2-fluoro-4-(1,1,2,3,3,3-hexafluoropropoxy)phenyl]urea, 2-tert-butylimino-3-isopropyl-5-phenyl-3,4,5,6-tetrahydro-2H-1,3,5-thiadiazon-4-one and 1-(2,6-difluorobenzoyl)-3-[2-fluoro-4-(1,1,2,2-tetrafluoroethoxy)phenyl]urea; pyrazole compounds such as 5-amino-4-dichlorofluoromethylsulfenyl-1-(2,6-dichloro-4-trifluoromethylphenyl)pyrazole, 5-amino-1-(2,6-dichloro-4-trifluoromethylphenyl)-4-trifluoromethysulfenylpyrazole; chloronicotyl compounds such as acetamiprid, nitenpyram and diacloden; cartap, buprofezin, thiocyclam, bensultap, fenoxycarb, fenazaquin, fenpyroxymate, pyridaben, pyriproxyfen, hydramethylnon, thiodicarb, chlorfenapyr, fenpyroximate, pymetrozine, pyrimidifen, tebufenozide, tebufenpyrad, triazamate, indoxacarb, sulfluramid, milbemectin, avermectin, boric acid or paradichlorobenzene.

Examples of the fungicides include benzimidazole compounds such as benomyl carbendazim, thiabendazole and thiophanate-methyl; phenylcarbamate compounds such as diethofencarb; dicarboxyimide compounds such as procymidone, iprodione and vinclozolin; azole compounds such as diniconazole, epoxyconazole, tebuconazole, difenoconazole, cyproconazole, flusilazole and triadimefon; acylalanine compounds such as metalaxyl; carboxyamide compounds such as furametpyr, mepronil, flutolanil and tolyfluanid; organophosphate compounds such as tolclofos-methyl, fosetyl aluminum and pyrazophos; anilinopyrimidine compounds such as pyrimethanil, mepanipyrim and cyprodinil; cyanopyrrole compounds such as fludioxonil and fenpiclonil; antibiotics such as blasticidin-S, kasugamycin, polyoxin and validamycin; methoxyacrylate compounds such as azoxystrobin, kresoxim-methyl and metominostrobin; chlorothalonil manzeb, captan, folpet, oxine-copper, basic copper chloride, tricyclazole, pyroquilon, probenazole, phthalide, cymoxanil, dimethomorph, S-methylbenzo[1,2,3] thiadiazol-7-carbothioate, famoxadone, oxolinic acid, fluaziname., ferimzone, chlobenthiazone, isovaledione, tetrachloroisophthalonitrile, thiophthalimideoxybisphenoxyarsine, 3-iodo-2-propylbutylcarbamate, silver zeolite, silica gel silver, phosphate zirconium silver chloride, parahydroxy benzoic acid ester, sodium dehydroacetic acid and potassium sorbic acid.

Examples of the herbicides include triazine compounds such as atrazine and metribuzin; urea compounds such as fluometuron and isoproturon; hydroxybenzonitrile compounds such as bromoxynil and ioxynil; 2,6-dinitroaniline compounds such as pendimethalin and trifluralin; aryloxyalkanoic acid compounds such as 2,4-D, dicamba, fluoroxypyr and mecoprop; sulfonylurea compounds such as bensulfuron-methyl, metsulfuron-methyl, nicosulfuron, primsulfuron and cyclosulfamuron; imidazolinone compounds such as imazapyr, imazaquin and imazethapyr; bispyribac-sodium, bisthiobac-sodium, acifluofen-sodium, sulfentrazone, paraquat, flumetsulam, triflusulfuron-methyl, fenoxaprop-P-ethyl, cyhalofop-butyl, diflufenican, norflurazone, isoxaflutole, glufosinate-ammonium, glyphosate, bentazon, benthiocarb, mefenacet, propanyl or flutiamide.

Example of the plant growth regulators include maleic hydrazide, clormequat, ethephon, giberellin mepiquat chloride, thidiazuron, inabenfide, paclobutrazol and uniconazole.

Examples of the insect repellents include 1S, 3R, 4R, 6R-carane-3,4-diol and dipropyl 2,5-pyridine dicarboxylate.

As the solvent utilized in the microencapsulating process of the present invention, a solvent should be inactive against the solid substances. Further, the solvent should be selected wherein said solid substance is insoluble or difficult to dissolve in concerning to the solubility of the said solid substance in the solvent. For example, water may be utilized as the solvent when the solid substance is water-insoluble or is difficult to dissolve in water, and an organic solvent may be utilized when the solid substance is, like an inorganic powder, insoluble or difficult to dissolve in said organic solvent such as hydrocarbons.

The following explanation is an example of when water is used as a solvent.

The dispersion phase is prepared from a solution containing the substance which forms the middle layer and the solid substance that is insoluble difficult to dissolve in said solution.

The substance which forms the middle layer is a substance that is able to be separated from a previously prepared aqueous solution.

The phase separation in the present invention is a phenomenon wherein a substance is separated as a liquid or solid from the solution, resulting in a 2-phase condition such as a liquid-liquid or liquid-solid condition by the procedures wherein the temperature, pH or solvent components are changed, hydrogen bonding, Van der Waals force or joint electrostatic actions between two or more compounds. For example, in the case of heating an aqueous solution containing a certain water-soluble substance to a temperature wherein a cloudy appearance is seen (cloud point) or a temperature higher than thereof a condition wherein a 2-phase, liquid-liquid, phase separation wherein 1-phase is mainly water (solvent) and the other phase is mainly the water-soluble substance (solute) is possible. Said cloud point depends on the sort of the water-soluble substance.

As the substance that forms said middle layer, water-soluble substances are exemplified, but a substance with a cloud point from 20 to 90° C., especially from 30to 80° C., is preferable. Typical examples are polyvinyl alcohol; hydroxyalkylcelluloses such as hydroxypropyl cellulose and hydroxypropylmethylcellulose; non-ionic surfactants having a polyothyethylene group; and so on. Said dispersion phase is usually prepared from dispersing the solid substance in the aqueous solution containing the substance which forms the middle layer, and then adjusting a dispersed condition of the solid substances from usual methods such as wet-pulverizing if necessary. Furthermore, said dispersion phase may be prepared by having the solid substance previously dispersed in water, and then dissolving the substance which forms the middle layer in water.

The preparation temperature of the dispersion phase is not particularly limited if the temperature does not cause phase separation of the substance which forms the middle layer, but is usually around room temperature.

The concentration of the solid substance in the dispersion depends on the appropriate concentration of the necessary microcapsule, but is usually from 0.01 to 50% by weight, preferably from 0.1 to 30% by weight. The diameter of the solid substance depends on the desired diameter of the microcapsule, but is usually from 0.01 to 200 $\mu$m, preferably from 0.03 to 100 $\mu$m.

The concentration of the substance which forms the middle layer depends upon the concentration of the solid substance or the desired thickness of the necessary middle layer, but is usually from 0.005 to 10% by weight, preferably from 0.01 to 5% by weight.

The layer of the substance which forms the middle layer may be formed on said solid substance, generally on the surface, by separating the substance which forms the middle layer from the aqueous solution of the prepared dispersion, and being adsorbed by the coexisting said solid substance.

The phase separation of the substance which forms the middle layer from the aqueous solution is achieved by changing the temperature, pH or the solvent components as mentioned before, or the joint actions between different sorts of compounds.

In the case of phase separation due to temperature change, and when the above-mentioned water-soluble substance having cloud point is utilized as the substance which forms the middle layer, said dispersion phase is preserved at about or above the cloud point, the separated substance which forms the middle layer is adsorbed to the solid substance, and the layer is formed on said solid substance. The temperature preservation time depends on the sort of the utilized solid substance, or the sort or concentration of water-soluble substance that has the cloud point, but is usually from 10 minutes to 24 hours, preferably from 30 minutes to 12 hours, after commencing the separation. Furthermore, said temperature is a temperature above the cloud point, and is usually from the cloud point to the cloud point +20° C.

The phase separation and adsorption to the solid substance are performed under stirring. The stirring is usually performed at a speed not to precipitate the solid substance or more.

By polymerizing the monomer that is polymerizable by condensation (e.g. dehydrogenation) in the presence of a solid substance having the layer made of the substance which forms the middle layer, a polymer layer is formed on the layer made of the substance which forms the middle layer to obtain the objective microcapsule.

The polymer is obtained by polymerizing a monomer under respective reaction conditions, and for example, melamine resin from melamine and formalin, phenol resins from phenol or cresol and formalin, acetaldehyde or glutaraldehyde, urea resin from urea and formalin, guanamine resin from guanamine and formalin, polyamide resin from ε-caprolactame, cross-linked polypeptide from polypeptide and formalin or glutaraldehyde, epoxy resin from epichlorhydrin and bisphenol A.

The solid substance having the layer made of the substance which forms the middle layer is subjected to be formed polymer layer in a condition dispersed in usually water, an aqueous solution or a solution wherein water is the main solvent which usually contains 80 or more % by weight of water. Therefore, the monomer that is polymerizable by condensation added to form the polymer layer is preferably dissoluble in a solvent of water, or in other words water-soluble. Though melamine mentioned above is insoluble in water, it can produce water-soluble methylolmelamine by reacting formalin in an alkali condition. Though epichlorhydrin mentioned above is insoluble in water, it can produce a water-soluble substance by ring opening in an alkali condition. Therefore, water-insoluble methylolmelamine or epichlorhydrin can be utilized in the present invention.

The concentration of said monomer that is polymerizable by condensation depends on the concentration of the solid substance, the surface area of the solid substance or the thickness of the desired polymer layer, is usually from 0.001 to 20% by weight, preferably from 0.01 to 10% by weight.

The time and temperature of polymerization depends on the sort of utilized monomer or the sort of solid substance and the temperature is usually from 20 to 90° C., preferably from 30 to 80° C., and the time is usually from 10 min to 24 hours, preferably from 30 min to 12 hours.

Next, the microencapsulated method of utilizing joint electrostatic actions, in other words, the method by changing he pH value is described in detail. In that case, the process comprises (i) preparing a dispersion phase containing (a) an aqueous solution containing ionic substances and (b) a solid substance that is insoluble or difficult to dissolve in water, (ii) obtaining a solid substance which has a layer made of the ionic substances by varying a pH value of the solution and separating the ionic substance from the solution and (iii) polymelizing a monomer by condensation in the presence of the solid substance that has a layer made of the ionic substance.

The ionic substances are generally a combination of zwitter ionic/anionic substance or zwitter ionic/cationic substance. The zwitter ionic substances mean the substances that can produce zwitter ion in an aqueoue solution and are exemplified by gelatine, lauryl dimethyl aminoacetic acid betaine, amino acids and proteins. The anionic substances mean the substances that an produce anion in an aqueoue solution and are exemplified by gum arabic, maleic anhydride, styrene-maleic anhydride copolymer, ethylene-maleic anhydride copolymer, methyl vinyl ether-maleic anhydride copolymer, acrylic acid copolymer, polyvinyl-benenesulfonic acid, carboxymethy cellulose, carboxymethyl starch, sulfated starch, ligninsulfonic acid salt and dodecylbenzenesulfonic acid salts. The cationic substances mean the substances that can produce cation in an aqueoue solution and are exemplified by chitosan, cationated starch and polyoxyethylenestearylamine.

Further, the other microencapsulated methods are described as followings. In one case, the process comprises (i) preparing a dispersion phase comprising (a) an aqueous solution containing gelatine and (b) a solid substance that is insoluble or difficult to dissolve in water, (ii) obtaining a solid substance which has a layer made of gelatin by lowering a temperature of the solution and separating gelatin from the solution and (iii) polymelizing a monomer by condensation in the presence of the solid substance that has a layer made of gelatin. And in the other case, the process comprises (i) preparing a dispersion phase comprising (a) an aqueous solution containing polyvinyl alcohol and (b) a solid substance that is insoluble or difficult to dissolve in water, (ii) obtaining a solid substance which has a layer made of polyvinyl alcohol by adding boric acid to the solution and separating polyvinyl alcohol from the solution and (iii) polymerizing a monomer by condensation in the presence of the solid substance that has a layer made of polyvinyl alcohol.

The obtained microencapsulated composition of a solid substance may have, if necessary, by other ingredients, for example, synergists, emulsifiers, wetting agents, adhesives, stabilizers, pH adjusting agents, anti-freezing agents, anti-septics or anti-fungal agents added. Furthermore, the solvent may be removed, if necessary, by usual methods.

Heretofore, the microencapsulation of a solid substance that is insoluble or difficult to dissolve in water when water was the solvent was specified, but for the microencapsulation of a solid substance that is insoluble or difficult to dissolve in an organic solvent, other than using an organic solvent instead of water as the solvent, using ethylcellulose, for example, as the substance which forms the middle layer, and using a phase separation method wherein the method has a solvent that has low solubility against ethylcellulose (e.g. hexane, heptane and the like) added, the objective microcapsule is obtained in the same way as the water solvent.

Furthermore, it is possible to perform the present invention utilizing a solvent mixture of water and another solvent as the solvent, if necessary.

The average diameter of the obtained microcapsule of a solid substance depends on the size of the solid substance that becomes the core, but is usually from 0.03 to 300 $\mu$m, preferably from 0.05 to 200 $\mu$m.

The compositions of the present invention are applied by standard methods wherein the microencapsulated composition are appropriable, according to the characteristics of the active ingredients. For example, in the case of a pesticidal active ingredient, the compositions may be applied by standard methods when an aqueous pesticidal formulation is utilized. In other words, according to the sort of the pesticidal active ingredients in the microcapsules, the microencapsulated composition may be used by itself or diluted in water, for controlling pests in water paddies and fields, weeds in water paddies and fields, termites in households or cockroaches indoors. For example, in the situation of soil treatment for the objective of controlling termites indoors, depending on the concentration of the active ingredient, usually from 1 to 5 liters per 1 $m^2$ is applied; in the situation of wood treatment, depending on the concentration of the active ingredient, usually from 50 to 400 mL per 1 $m^2$ is applied; and in the situation of indoor cockroach controlling, depending on the concentration of the active ingredient, usually from 10 to 100 mL is applied. Furthermore, in the situation of utilizing aerial dispersion formulations, usually from 0.8 to 40 L per hectare of the formulation is applied.

Hereinafter, the present invention is explained in detail with the examples, but the present invention is not limited to the examples.

EXAMPLES

Example 1

1. Thirty grams (30 g) of 5-methoxy-3-(2-methoxyphenyl)-1,3,4-oxadiazol-2(3H)-one (common name: metoxadiazone) was added to a 0.33% aqueous solution of HPC-M (Nippon Soda product, hydroxypropylcellulose) to make the total 300 g. Glass beads with a diameter of 1 mm were added to this dispersion phase and were beads-pulverized at 500 rpm to obtain a metoxadiazone pulverized slurry.

2. Ten grams (10 g) of the pulverized slurry was transferred to a metallic container. After 5 g of a 0.4% aqueous solution of HPC-M was added to said pulverized slurry and the total body was made to 80 g with deionized water, the obtained slurry was stirred for 1 hour at 150 rpm in a thermostat kept at 50° C.

3. Separately, 3.75 g of Sumitex resin M-3 (Sumitomo Chemical product, methylolmelamine: 80% aqueous solution) was formulated by making the total 20 g with deionized water, was added under 150 rpm stirring to above-mentioned metoxadiazone pulverized slurry after HPC-M was adsorbed, then had the pH adjusted to 4.5, heated to 60° C., and allowed to react for 2 hours to produce a microencapsulated composition containing 1% metoxadiazone.

The microencapsulated metoxadiazone was confirmed by observing the present composition under an optical microscope (Nikon Corp. product, magnification: 400×).

Example 2

Other than replacing Sumitex resin M-3 with Sumitex resin MC (Sumitomo Chemical product, methylolmelamine: 80% aqueous solution), the same procedure as example 1 was performed to produce a microencapsulated composition containing 1% metoxadiazone.

The microencapsulated metoxadiazone was confirmed by observing the present composition in the same way as example 1.

Example 3

To 1 g of 1-naphthyl methylcarbamate (common name: carbaryl) in a metallic container, 12.5 g of a 4% aqueous solution of HPC-M was added, had the total made 80 g with deionized water, was then transferred to a 50° C. thermostat and was stirred for 1 hour at 150 rpm. Separately, 0.94 g of Sumitex resin M-3 was formulated by making the total 20 g with deionized water, was added to above-mentioned carbaryl pulverized solution after HPC-M was adsorbed, then had the pH adjusted to 4.5, heated to 60° C., and allowed to react for 2 hours to produce a microencapsulated composition containing 1% carbaryl.

The microencapsulated carbaryl was confirmed by observing the present composition in the same way as example 1.

Example 4

Other than modifying the amount of Sumitex resin M-3 from 0.94 g to 3.75 g, the same procedure as example 6 was performed to produce a microencapsulated composition containing 1% carbaryl.

The microencapsulated carbaryl was confirmed by observing the present composition in the same way as example 1.

Example 5

Other than replacing Sumitex resin M-3 with Sumitex resin MC, the same procedure as example 3 was performed to produce a microencapsulated composition containing 1% carbaryl.

The microencapsulated carbaryl was confirmed by observing the present composition in the same way as example 1.

Example 6

1. To 30 g of N-(1,1,3-trimethyl-2-oxa-4-indanyl)-5-chloro-1,3-dimethylpyrazole-4-carboxamide (common name: furametpyr), 7.5 g of a 10% aqueous solution of alkali-treated gelatin (Nitta Gelatin product #250) and deionized water were added for preparing a 100 g of aqueous dispersion. Glass beads with a diameter of 0.75–1 mm were added to the aqueous dispersion and were beads-pulverized at 1000 rpm to obtain a furametpyr pulverized slurry.

2. Five grams of the pulverized slurry was transferred to a metallic container. After 17.5 g of the 10% aqueous solution of alkali-treated gelatin and 10 g of Sumirez resin DS40K (Sumitomo Chemical product, styrene-maleic anhydride copolymer: 35% aqueous solution) were added to said pulverized slurry and the total body was made to 75 g with deionized water. It was stirred for 15 minutes at 200 rpm in a thermostat kept at 50° C. and then the pH value was adjusted to 4.5 by adding acetic acid.

3. Separately, 1.7 g of Sumitex resin M-3 was formulated by making the total 7 g with deionized water, was added to above-mentioned aqueous furametpyr dispersion, then allowed to react for 2 hours at 50° C. to produce a microencapsulated composition containing 1.5% furametpyr.

The microencapsulated furametpyr was confirmed by observing the present composition under an optical microscope (Nikon Corp. product, magnification: 400×).

Example 7

1. To 20 g of cyclohex-1-ene-1,2-dicarboximidomethyl 2,2-dimethyl-3-(2-methylprop-1-enyl) cyclopropanecarboxylate (common name: tetramethrin), 5 g of a 10% aqueous solution of alkali-treated gelatin (Nitta Gelatin product #250) and deionized water were added for preparing a 100 g of aqueous dispersion. Glass beads with a diameter of 0.75-1 mm were added to the aqueous dispersion and were beads-pulverized at 1000 rpm to obtain a tetramethrin pulverized slurry.

2. Five grams of the pulverized slurry was transferred to a metallic container. After 17.5 g of the 10% aqueous solution of alkali-treated gelatin, 10 g of Sumirez resin DS40K and 0.2 g of antifoaming silicone TSA730 (Toshiba Silicone product) were added to said pulverized slurry and the total body was made to 75 g with deionized water. It was stirred for 15 minutes at 200 rpm in a thermostat kept at 50° C. and then the pH value was adjusted to 4.6 by adding acetic acid.

3. Separately, 1.8 g of Sumitex resin M-3 was formulated by making the total 7 g with deionized water, was added to above-mentioned aqueous tetramethrin dispersion, then allowed to react for 2 hours at 50° C. to produce a microencapsulated composition containing 1% tetramethrin.

The microencapsulated tetramethrin was confirmed by observing the present composition under an optical microscope (Nikon Corp. product, magnification: 400×).

Comparative example 1

To 1 g of 1-naphthyl methylcarbamate (common name:carbaryl) in a metallic container, 12.5 g of a 4% aqueous solution of HPC-M was added, had the total made 100 g with deionized water, was then transferred to a 50° C. thermostat and was stirred for 1 hour at 150 rpm to produce the formulation.

Based on the test examples, the percent moribund and lethal ratio were calculated from the following equations.

$$\text{percent moribund (\%)} = \frac{(\text{quantity of moribund insects} + \text{quantity of dead insects})}{\text{total number of insects}} \times 100$$

$$\text{lethal ratio (\%)} = \frac{\text{quantity of dead insects}}{\text{total number of insects}} \times 100$$

Test Example 1

Ten (10) worker Formosan subterranean termites (*Coptotermus formosanus* Shiraki) were placed in a plastic Petri dish, 6 mL of each of the compositions from examples 1 through 5 was sprayed at a distance of about 60 cm with a spray gun. Afterwards, said termites were transferred to a new plastic Petri dish and were observed one day later. The percent moribund was all 100%.

Test Example 2

Ten grams (10 g) of soil was deposited on a plastic Petri dish, 6 mL of each of the compositions from examples 1 through 5 was sprayed at a distance of about 60 cm with a spray gun. Subsequently, ten (10) worker Formosan subterranean termites (*Coptotermus formosanus* Shiraki) were placed in said plastic Petri dish. Observing said plastic Petri dish 1 day later, the percent moribund was all 100%.

Test Example 3

The formulations from examples 3 through 5 and comparative examples 1 were applied to a 15 cm×15 cm plywood at 50 g/m² and were left at room temperature. Three (3) weeks later, a plastic barrier was placed on the plywood, 10 German cockroaches (*Blattella germanica*; male to female ratio=1:1) were released within said barrier for 2 hours, then said insects were gathered into a new plastic cup, and the lethal ratio was examined 3 days later. Each example were repeated thrice. The results are given in table 1.

TABLE 1

| Tested formulations | Lethal ratio (%) |
|---|---|
| Example 3 | 100 |
| Example 4 | 100 |
| Example 5 | 100 |
| Comparative example 1 | 80 |

Test Example 4

The formulations from example 5 and comparative example 1 were diluted with distilled water to formulate a 50×dilution. Filter paper with a diameter of 3.8 cm was stuck onto the cover of a 200 mL vial. A hundred milligrams (100 mg) of each diluted formulation was evenly applied. After depositing 10 cat fleas (*Ctenocephalides felis*) into the vial, the vial was sealed with the cover that comprises the treated filter paper, was placed on its side so the fleas can come in contact with the filter paper, was preserved at room temperature, and was examined for the lethal rate 24 hours later. Each example was repeated 2 to 3 times. A sample wherein the filter paper had distilled water applied, was tested as the control. Results are given in table 2.

TABLE 2

| Tested formulations | Lethal ratio (%) |
|---|---|
| Example 5 | 75.0 |
| Comparative example 1 | 10.0 |

What is claimed is:

1. A microencapsulation method of a solid material comprising (i) preparing a dispersion phase comprising (a) a solution containing a substance which forms a middle layer and (1) a solid substance that is insoluble or difficult to dissolve in said solution, (ii) obtaining a solid substance which has a layer made of the substance which forms the middle layer by phase-separating the substance which forms the middle layer from the solution and (iii) reacting a monomer that is polymerizable by condensation in the presence of the solid substance that has a layer made of the substance which forms the middle layer.

2. A microencapsulation method of a solid material according to claim 1, comprising (i) preparing a dispersion phase comprising (a) an aqueous solution containing a substance having a cloud point and (b) a solid substance that is insoluble or difficult to dissolve in water, (ii) obtaining a solid substance which has a layer made of the substance having a cloud point by raising a temperature of the solution and separating the substance having a cloud point from the solution and (iii) polymerizing a monomer by condensation in the presence of the solid substance that has a layer made of the substance having a cloud point.

3. A microencapsulation method of a solid material according to claim 2, wherein the substance having a cloud point is one selected from the group consisting of polyvinyl alcohol, hydroxyalkylcelluloses and non-ionic surfactants.

4. A microencapsulation method of a solid material according to claim 1, comprising (i) preparing a dispersion phase comprising (a) an aqueous solution containing ionic substances and (b) a solid substance that is insoluble or difficult to dissolve in water, (ii) obtaining a solid substance which has a layer made of the ionic substances by varying a pH value of the solution and separating the ionic substance from the solution and (iii) polymerizing a monomer by condensation in the presence of the solid substance that has a layer made of the ionic substance.

5. A microencapsulation method of a solid material according to claim 1, comprising (i) preparing a dispersion phase comprising (a) an aqueous solution containing gelatine and (b) a solid substance that is insoluble or difficult to dissolve in water, (ii) obtaining a solid substance which has a layer made of gelatin by lowering a temperature of the solution and separating gelatin from the solution and (iii) polymerizing a monomer by condensation in the presence of the solid substance that has a layer made of gelatin.

6. A microencapsulation method of a solid material according to claim 1, comprising (i) preparing a dispersion phase comprising (a) an aqueous solution containing polyvinyl alcohol and/or sodium carboxymethylcellulose and (b) a solid substance that is insoluble or difficult to dissolve in water, (ii) obtaining a solid substance which has a layer made of polyvinyl alcohol and/or sodium carboxymethylcellulose by adding a salt to the solution and separating polyvinyl alcohol and/or sodium carboxymethylcellulose from the solution and (iii) polymerizing a monomer by condensation in the presence of the solid substance that has a layer made of polyvinyl alcohol and/or sodium carboxymethylcellulose.

7. A microencapsulation method of a solid material according to claim 1, comprising (i) preparing a dispersion phase comprising (a) an aqueous solution containing polyvinyl alcohol and (b) a solid substance that is insoluble or difficult to dissolve in water, (ii) obtaining a solid substance which has a layer made of polyvinyl alcohol by adding boric acid to the solution and separating polyvinyl alcohol from the solution and (iii) polymerizing a monomer by condensation in the presence of the solid substance that has a layer made of polyvinyl alcohol.

8. A method as recited in either claims 1, 2, 3, 4, 5, 6 or 7, wherein the monomer is polymerizable by dehydrogenation condensation.

9. A method according to claim 8, wherein the solid substance is an active ingredient of a pesticide.

10. A microcapsule of a solid substance having a middle layer wherein the microcapsule is covered by a polymer that is prepared by condensation reaction.

11. A microcapsule according to claims 10, wherein the middle layer is made of water-soluble substance.

12. A microcapsule according to claims 10, wherein the middle layer is made of water-soluble substance which has a cloud point.

13. A microcapsule according to claims 10, wherein the polymer is selected from the group consisting of melamine resin, phenol resin, urea resin, guanamine resin, polyamide resin, cross-linked polypeptide and epoxy resin.

* * * * *